No. 778,476.  
Patented December 27, 1904.

UNITED STATES PATENT OFFICE.

KARL ELBEL, OF BIEBRICH, GERMANY, ASSIGNOR TO THE FIRM OF KALLE AND COMPANY, OF BIEBRICH, GERMANY.

BETA-NAPHTHOL AZO DYE AND PROCESS OF MAKING SAME.

SPECIFICATION forming part of Letters Patent No. 778,476, dated December 27, 1904.

Application filed October 5, 1904. Serial No. 227,290.

*To all whom it may concern:*

Be it known that I, KARL ELBEL, a subject of the King of Prussia, Emperor of Germany, residing at Biebrich, Germany, have invented certain new and useful Improvements in the Manufacture of Beta-Naphthol-Azo Colors, of which the following is a specification.

My invention relates to the manufacture of new beta-naphthol-azo colors, which I obtain by acting on beta-naphthol with the diazo derivatives of 1.2 amidonaphtholmono or disulfo acids. In order to obtain these coloring-matters in a pure state and in a good yield, it is necessary to employ very concentrated diazo- and beta-naphthol solutions. In dilute solutions or in solutions of a concentration as commonly employed in azo-color manufacture a combination does not take place. It is further necessary to employ an excess of alkali.

The new products dye wool in an acid-bath bluish-red to violet shades, which are converted by a subsequent treatment with a bichromate into violet to bluish-black shades, which meet the highest requirements as regards fastness in all respects.

In the following I give an example according to which these coloring-matters may be obtained; but my invention is not limited to the proportions and other conditions therein mentioned.

Thirty-four kilos of the acid sodium salt of 1.2 amidonaphthol 3.6 disulfo acid are mixed with one hundred liters water, fourteen kilos sodium acetate, and thirty-five kilos of fifty per cent. acetic acid and diazotized at about 15° centigrade by the gradual addition of sodium nitrite in aqueous solution. As the diazotizing operation is proceeding the amidonaphtholsulfo acid is dissolved. The solution is then rendered alkaline with a concentrated beta-naphtholsoda solution, which contains fourteen kilos beta-naphthol and is at a temperature of or about 70° centigrade. The mixture is stirred and maintained at a temperature of 30° to 40° centigrade until the combination is complete. After cooling the dye is separated by acidulating the liquid, and by the addition of common salt is filtered, pressed, and dried. It dyes in a bath acidified with sulfuric acid on wool a Bordeaux red, which is converted into a bright-bluish black by a subsequent treatment with a bichromate. It is a dark-brown powder soluble in water with a bluish-red color, which color is converted into a bright blue by addition of soda, little soluble in alcohol with red color, soluble in concentrated sulfuric acid with blue color.

If in the aforegiven example the 1.2 amidonaphthol-3.6-disulfo acid is replaced by the 1.2 amidonaphthol-4.6-disulfo acid a very similar result is obtained. If the 1.2 amidonaphthol-4-monosulfo acid is employed, a coloring-matter is obtained which is less easily soluble and separates almost completely from the alkaline combination liquid and which produces on wool when dyed in an acid-bath and subsequently treated with a bichromate a black of a more violet tinge.

What I claim is—

1. The manufacture of beta-naphthol-azo colors by combining the diazo derivatives of 1.2 amidonaphtholsulfo acids with beta-naphthol in highly-concentrated solutions and in presence of an excess of alkali.

2. The new beta-naphthol-azo colors obtainable by combining the diazo derivatives of 1.2 amidonaphtholsulfo acids with beta-naphthol in highly-concentrated solutions and in presence of an excess of alkali which dye wool directly in a bath acidulated with sulfuric acid bluish-red to violet shades convertible into violet to blue blacks by a subsequent treatment with bichromates.

3. The new beta-naphthol-azo color obtainable by combining the diazo compound of 1.2 amidonaphthol-3.6-disulfo acid with beta-naphthol in highly-concentrated solutions and in presence of an excess of alkali, which coloring-matter is a dark-brown powder soluble in water with bluish-red color, which color is converted into a bright blue by addition of soda, little soluble in alcohol with red color, soluble in concentrated sulfuric acid with blue color, dyeing in a bath acidified with sulfuric acid on wool a Bordeaux red, which is converted into a bright-bluish black by a subsequent treatment with a bichromate.

In testimony whereof I have signed my name to this specification in the presence of two subscribing witnesses.

KARL ELBEL.

Witnesses:
    IGNAZ ROSENBERG,
    JEAN GRUND.